(12) United States Patent
Reimann

(10) Patent No.: US 11,593,467 B2
(45) Date of Patent: Feb. 28, 2023

(54) SYSTEMS AND METHODS FOR BIOMETRIC AUTHORIZATION USING A MAIN SCREEN AND A VISUAL INDICATOR

(71) Applicant: Red Hat, Inc., Raleigh, NC (US)

(72) Inventor: Jens Reimann, Grasbrunn (DE)

(73) Assignee: Red Hat, Inc., Raleigh, NC (US)

(*) Notice: Subject to any disclaimer, the term of this patent is extended or adjusted under 35 U.S.C. 154(b) by 282 days.

(21) Appl. No.: 16/688,553

(22) Filed: Nov. 19, 2019

(65) Prior Publication Data

US 2021/0150008 A1    May 20, 2021

(51) Int. Cl.
*G06F 21/00* (2013.01)
*G06F 21/32* (2013.01)

(52) U.S. Cl.
CPC .................... *G06F 21/32* (2013.01)

(58) Field of Classification Search
CPC ...................................... G06F 21/32
See application file for complete search history.

(56) References Cited

U.S. PATENT DOCUMENTS

| | | | |
|---|---|---|---|
| 10,009,179 B2 | 6/2018 | Acar et al. | |
| 10,360,359 B2 | 7/2019 | Jammalamadaka et al. | |
| 2008/0120707 A1 | 5/2008 | Ramia | |
| 2012/0054862 A1* | 3/2012 | Jevans | G06F 21/32 726/22 |
| 2016/0253675 A1* | 9/2016 | Remillet | G06T 17/20 705/44 |
| 2016/0259929 A1* | 9/2016 | Cash | G06Q 20/341 |
| 2016/0379211 A1* | 12/2016 | Hoyos | H04L 9/3263 705/75 |
| 2017/0339151 A1* | 11/2017 | Van Os | G06Q 20/40145 |
| 2018/0114223 A1* | 4/2018 | Dellostritto | G06Q 30/0633 |
| 2018/0241731 A1* | 8/2018 | Guo | G06F 21/629 |
| 2018/0260546 A1* | 9/2018 | Iwata | G06K 9/00221 |
| 2019/0164156 A1* | 5/2019 | Lindemann | H04L 9/3239 |

(Continued)

FOREIGN PATENT DOCUMENTS

| | | |
|---|---|---|
| CN | 104580125 B | 4/2015 |
| WO | 2018110793 A1 | 6/2018 |

OTHER PUBLICATIONS

Allen, Darren, "New multi-factor biometrics scanner aims to make online banking safer," IT Insights for Business, Jan. 6, 2017, Future Publishing, 7 pages.

(Continued)

*Primary Examiner* — Jeffrey C Pwu
*Assistant Examiner* — William A Corum, Jr.
(74) *Attorney, Agent, or Firm* — Dority & Manning, P.A.

(57) ABSTRACT

An electronic device includes a biometric reader, a verification indicator, a main screen, a memory, and a processor device. The verification indicator is associated with the biometric reader. The processor device is coupled to the biometric reader, the verification indicator, the main screen, and the memory. The processor device is provided to receive a request for biometric authorization of an action, the request comprising verification information that allows a user to uniquely identify the request, display a representation of the verification information from the verification indicator, provide a representation of the verification information from the verification indicator, and authorize the action based on biometric information from the biometric reader.

20 Claims, 4 Drawing Sheets

(56) References Cited

U.S. PATENT DOCUMENTS

2020/0143353 A1* 5/2020 Van Os .............. H04L 67/1078
2021/0042724 A1* 2/2021 Rathod ................ G06Q 30/06
2021/0051144 A1* 2/2021 Zhou ................ G06V 40/1365
2022/0005046 A1* 1/2022 Kim ..................... G06Q 20/40

OTHER PUBLICATIONS

Author Unknown, "Fingerprint Sensor and All That You Can Do With It," 2019, Reliance Digital, 3 pages.
Sharma, Lokesh, et al., "Mobile Banking Transaction Using Fingerprint Authentication," International Conference an Inventive Systems and Control, 2018, IEEE, pp. 1300-1305.

* cited by examiner

SYSTEMS AND METHODS FOR BIOMETRIC AUTHORIZATION USING A MAIN SCREEN AND A VISUAL INDICATOR

BACKGROUND

Biometric authentication is the use of biometric information such as a fingerprint scan, a facial scan, a retinal scan, or the like to authorize an action. Biometric authentication has gained popularity in recent years due to its potential to provide both increased security and convenience. For example, many electronic devices now include a biometric authorization device such as a fingerprint scanner, a facial scanner, or the like, which allows for biometric authentication of actions on the device.

SUMMARY

In one example, an electronic device includes a biometric reader, a verification indicator, a main screen, a memory, and a processor device. The verification indicator is associated with the biometric reader. The processor device is coupled to the biometric reader, the verification indicator, the main screen, and the memory. The processor device is provided to receive a request for biometric authorization of an action, the request comprising verification information that allows a user to uniquely identify the request, display a representation of the verification information from the main screen, provide a representation of the verification information from the verification indicator, and authorize the action based on biometric information from the biometric reader. By displaying a representation of the verification information on the main screen and providing a representation of the verification information from the verification indicator, a user can verify that the action being authorized by the biometric reader is the same as the one being represented on the main screen. Accordingly, the security of biometric authentication can be improved.

In one example, the verification indicator comprises a textual display and the representation of the verification information provided from the verification indicator comprises text provided on the textual display. In another example, the verification information comprises information about the action to be authorized by the request for biometric authorization. In another example, the representation of the verification information displayed from the main screen is different from the representation of the verification information provided from the verification indicator. In another example, the representation of the verification information displayed from the main screen is the same as the representation of the verification information provided from the verification indicator.

In one example, a method for biometric authorization includes receiving a request for biometric authorization of an action from an application, the request comprising verification information that allows a user to uniquely identify the request. The method further includes displaying a representation of the verification information from a main screen and providing a representation of the verification information from a verification indicator that is associated with a biometric reader. Finally, the method includes authorizing the action based on biometric information from the biometric reader. By displaying a representation of the verification information on the main screen and providing a representation of the verification information from the verification indicator, a user can verify that the action being authorized by the biometric reader is the same as the one being represented on the main screen. Accordingly, the security of biometric authentication can be improved.

In one example, a computer program product for biometric authorization is stored on a non-transitory computer-readable storage medium and includes instructions configured to cause a processor device to receive a request for biometric authorization of an action from an application, the request comprising verification information that allows a user to uniquely identify the request. The instructions further cause the processor device to display a representation of the verification information from a main screen and provide a representation of the verification information from a verification indicator that is associated with a biometric reader. Finally, the instructions cause the processor device to authorize the action based on biometric information from the biometric reader. By displaying a representation of the verification information on the main screen and providing a representation of the verification information from the verification indicator, a user can verify that the action being authorized by the biometric reader is the same as the one being represented on the main screen. Accordingly, the security of biometric authentication can be improved.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1A:
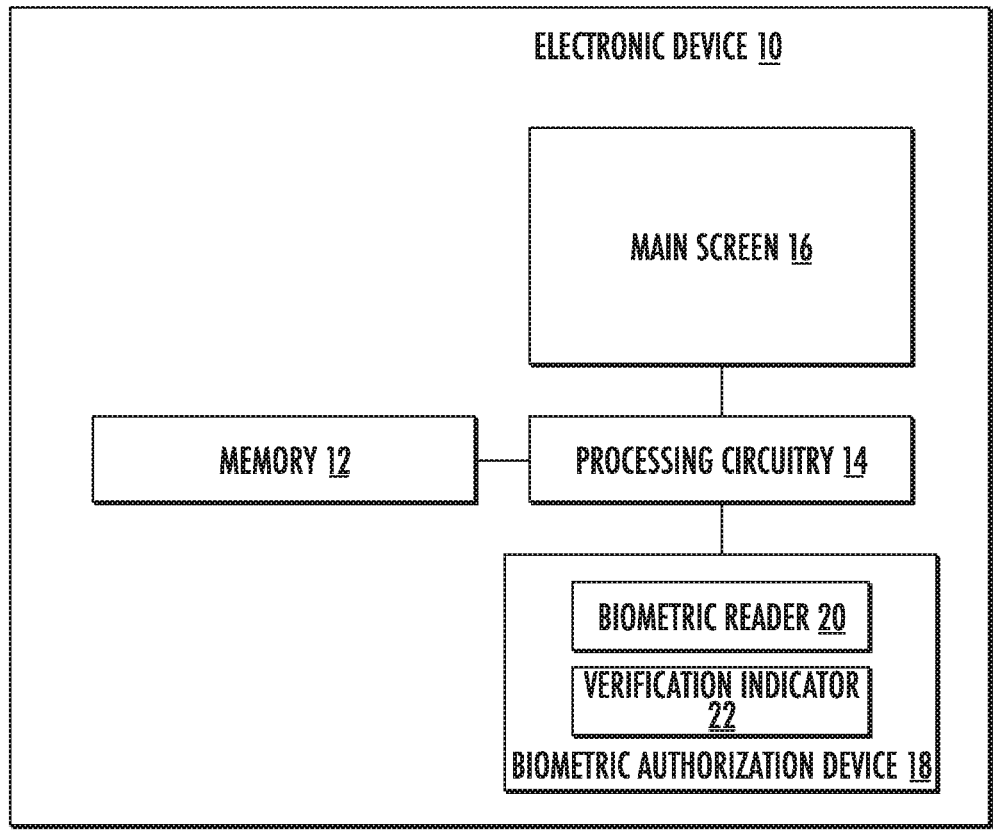
FIG. 1A illustrates an electronic device capable of providing biometric authorization of an action with increased security according to one example of the present disclosure.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Biometric authentication of actions on electronic devices has the potential to provide both increased security and convenience. However, in many electronic devices including a biometric authorization device there may be potential for malicious applications to hide the action that is being authorized by the biometric authorization device so that a user thinks they are authorizing one action but are actually authorizing a different and undesired action. Generally, when biometric authorization of an action is requested by an application running on an electronic device, a user interface is provided on a main screen of the device requesting the user to provide biometric information (e.g., a fingerprint scan, facial scan, retinal scan, or the like) to a biometric authorization device (e.g., a fingerprint scanner, a facial scanner, a retinal scanner, or the like) to authorize the action. For example, a banking application may request biometric authorization to transfer funds from one account to another, and in response a user interface asking the user to authorize the transfer of funds by providing biometric information to a biometric authorization device may be provided on the main screen. Due to the fact that several applications may be running on the electronic device at the same time and that all of these applications may have general access to the main screen, there is potential for a malicious application to trigger another application to request biometric authorization of an action and conceal the action that is being authorized by overwriting all or a portion of the main screen. For example, a malicious application could trigger a banking application to request biometric authorization to transfer funds from one account to another and overwrite the user interface generated in response to the request to authorize the transfer of funds with a misleading user interface, such as one asking the user to provide biometric information to log into a game. The user may then provide biometric information to a biometric authorization device thinking that they are logging into a game but actually authorizing a transfer of funds via the banking application. In short, there is a problem with current electronic devices including biometric authorization devices wherein a user may not be able to accurately identify what action is being authorized by the biometric authorization device.

To solve the problems discussed above, a biometric authorization device having a verification indicator and a biometric reader is provided in an electronic device. Access to the biometric authorization device is provided by a biometric authorization module in an operating system of the electronic device. Requests for biometric authorization of an action are provided from an application to the biometric authorization device. The requests are provided with verification information, which is information that allows a user to uniquely identify the request. The biometric authorization module causes the verification indicator of the biometric authorization device to provide a representation of the verification information and the main screen to display a representation of the verification information. For example, a request to transfer funds from one account to another may be provided from a banking application to the biometric authorization module. The request may include verification information, which in one example is a random color. The biometric authorization module may cause the verification indicator to display a representation of the color, for example, via a multi-color light emitting diode (LED). Further, a name of the color or the color itself may be displayed on the main screen. As another example, the verification information could be text describing the request or the action that is being authorized by the request. For example, the verification information could be "transfer $X from account Y to account Z." The biometric authorization module may cause the verification indicator to display the text of the verification information via a textual display of some kind. Further, the text of the verification information may be displayed on the main screen. The biometric authorization module limits access to the biometric authorization device such that while a request for biometric authorization is pending only the information based on the verification information can be displayed from the verification indicator and only one request for biometric authorization can be processed at a time. Accordingly, a user can verify that the request for biometric authorization represented by the user interface on the main screen is the same one being authorized by the biometric authorization device by verifying a relationship between the verification information on the main screen and the information provided from the verification indicator.

The examples herein facilitate an improvement to computer functionality itself via increased security in biometric authentication of actions on the computer. Thus, the examples are directed to specific improvements in computer functionality.

FIG. 1A is a block diagram illustrating an electronic device 10 according to one example of the present disclosure. The electronic device 10 includes a memory 12, processing circuitry 14, a main screen 16, and a biometric authorization device 18. The memory 12 is coupled to the processing circuitry 14. The processing circuitry 14 is coupled to the main screen 16 and the biometric authorization device 18. The main screen 16 provides a user interface to facilitate user interaction with the electronic device 10. While only one main screen 16 is shown, the electronic device 10 may include any number of main screens 16. "Main" in the context of the main screen 16 simply means the screen on which a main or primary user interface is provided, and is not meant to imply that the main screen 16 is the only screen of the electronic device 10. The biometric authorization device 18 includes a biometric reader 20 to facilitate obtaining biometric information from a user and a verification indicator 22 to provide verification information so that a user can verify what is being authorized by the biometric authorization device 18 as discussed below. The biometric reader 20 may be any device capable of reading biometric information from a user. For example, the biometric reader 20 may be a fingerprint reader, a facial recognition scanner, an iris scanner, or the like. The verification indicator 22 may be any device capable of providing information to a user. In one example, the verification indicator 22 may provide visual information and thus may be a multi-color light emitting diode (LED), a single-character display, a multi-character display, a screen, or the like. In another example the verification indicator 22 may provide audible information and thus may be a speaker. In another example the verification indicator 22 may provide haptic information and thus may be a haptic device.

Figure 1B:
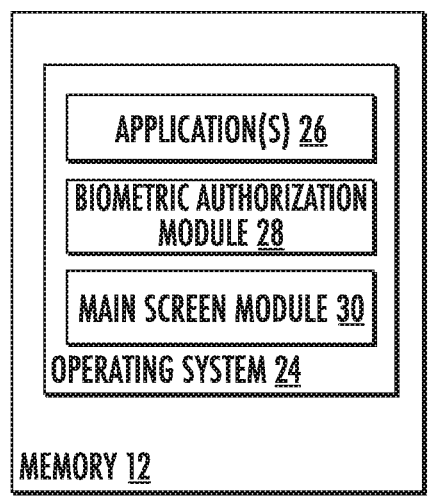
FIG. 1B illustrates details of a memory in the electronic device including instructions for providing biometric authorization of an action with increased security according to one example of the present disclosure.

FIG. 1B shows details of the memory 12 according to one example of the present disclosure. The memory 12 stores instructions related to an operating system 24, one or more applications 26, a biometric authorization module 28, and a main screen module 30. The processing circuitry 14 accesses the memory 12 to retrieve and execute the instructions and thus provide the functionality of the operating system 24, the one or more applications 26, the biometric authorization module 28, and the main screen module 30 discussed herein.

The operating system 24 provides access to the hardware of the electronic device 10 to the applications 26. For example, the operating system 24 provides access to the main screen 16 via the main screen module 30 and provides access to the biometric authorization device 18 via the biometric authorization module 28. As discussed above, the main screen module 30 provides general access to the main screen such that any of the applications 26 can access and draw on the main screen 16 at any time. This creates a security risk when only the main screen 16 is used to identify an action that is being authenticated by the biometric authorization device 18, since a malicious application 26 can misrepresent what is being authorized by the biometric authorization device 18 by overwriting all or a portion of the main screen 16. Accordingly, the verification indicator 22 is provided in the biometric authorization device 18 and operated as discussed below so that a user can verify what is being authorized by the biometric authorization device 18. The biometric authorization module 28 provides only limited access to the verification indicator 22 such that information can only be provided from the verification indicator 22 in response to a request for biometric authentication of an action. That is, the biometric authorization module 28 is provided such that there is no general-purpose access to the verification indicator 22. Further, the biometric authorization module 28 is provided such that only one request for biometric authorization of an action can be processed at a time.

Figure 2:
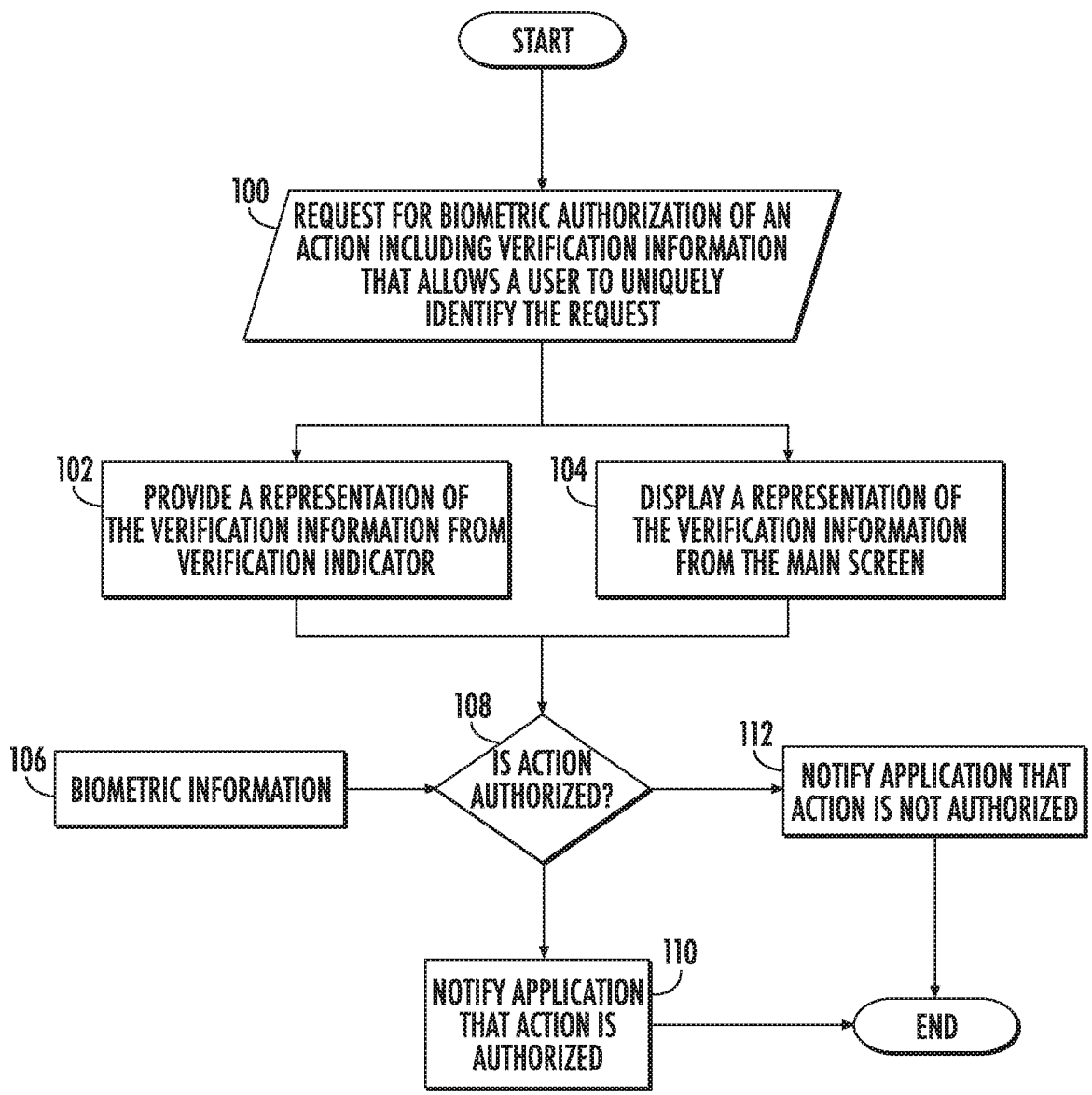
FIG. 2 is a flow diagram illustrating a method for providing biometric authorization of an action with increased security according to one example of the present disclosure.

FIG. 2 is a flow diagram illustrating a method for operating the electronic device 10 to provide biometric authorization of an action according to one example of the present disclosure. First, a request for biometric authorization of an action is received from an application 26 (block 100). As discussed above, access to the biometric authorization device 18 is provided via the biometric authorization module 28 and thus the request is received by the biometric authorization module 28. The request includes verification information, which is information that allows a user to uniquely identify the request. The verification information can be any information that identifies the request. For example, the verification information can be a color identifying the request, a code identifying the request, textual information identifying the request, or any other information identifying the request. In some cases, the verification information can be about the action to be authorized by the request. A representation of the verification information is provided from the verification indicator 22 of the biometric authorization device 18 (block 102). The biometric authorization module 28 may interface with the biometric authorization device 18 to cause the representation of the verification information to be provided from the verification indicator 22. The representation of the verification information can be any information that is derived from or otherwise generated based on the verification information. As discussed above, the verification information may be a color identifying the request, a code identifying the request, or textual information identifying the request. The representation of the verification information could be the color represented by a multi-color LED, the code represented by flashing a light, sound, haptic feedback, or the like, or the textual information represented on a display or screen. Simultaneously, a representation of the verification information is displayed from the main screen 16 (block 104). The representation of the verification information displayed from the main screen 16 may be the same or different from the representation of the verification information provided from the verification indicator 22. Following the examples given above, the representation of the verification information on the main screen 16 could be a textual description of the color or the color itself, a textual description of the code, or the textual information. The biometric authorization module 28 may interface with the main screen module 30 to cause the verification information to be displayed from the main screen 16, or the application 26 from which the request was received may interface with the main screen module 30 to cause the verification information to be displayed from the main screen 16.

As an example, if the verification information is a color identifying the request and the verification indicator 22 is a multi-color LED, the color of the verification indicator 22 may be changed to the color, and the color or a textual description of the color may also be displayed from the main screen 16 so that a user can verify that the request for biometric authorization represented on the main screen 16 is the same request that is being authorized by the biometric authorization device 18. As another example, if the verification information is textual information and the verification indicator 22 is a textual display of some kind, the textual information can be scrolled or otherwise provided by the verification indicator 22 and also displayed by the main screen 16 so that a user can verify that the request for biometric authorization represented on the main screen 16 is the same request that is being authorized by the biometric authorization device 18.

At some point, the user may provide biometric information to the biometric reader 20 (block 106). The biometric authorization module 28 then determines if the action is authorized based on the biometric information (block 108). Determining if an action is authorized based on the biometric information may involve comparing the biometric information to a set of known biometric information for a user or users that are able to authorize the action. If the action is authorized, the biometric authorization module 28 notifies the application 26 as such (block 110). If the action is not authorized, the biometric authorization module 28 similarly notifies the application 26 as such (block 112). The application 26 can then perform the action or not perform the action based on whether or not the action was authorized.

Notably, the biometric authorization module 28 limits access to the biometric reader 20 and the verification indicator 22. The verification indicator 22 may only be accessible by the biometric authorization module 28 and the biometric authorization module 28 may ensure that the verification indicator 22 can only provide information based on a valid request for biometric authorization of an action, and may not be changed for any other purpose. Put another way, there is no general-purpose access to the verification indicator 22. Further, when a request for biometric authorization of an action is currently pending, the biometric authorization module 28 does not permit other applications 26 to change the information provided by the verification indicator 22. This prevents malicious applications 26 from concealing the action that is currently being authorized by the biometric authorization device 18 as discussed above. Further, the biometric authorization module 28 only allows one request for biometric authorization to be processed at a time. When a request for biometric authorization is currently being processed by the biometric authorization module 28 and an additional request for biometric authorization is received, the biometric authorization module 28 may queue the additional request until the original request has been authorized, not authorized, or cancelled by a user, or may immediately suspend or cancel the original request and process the additional request. When a request is no longer pending (due to being authorized, not authorized, suspended, or cancelled), the biometric authorization module 28 causes the information based on the verification information to stop being provided from the verification indicator 22 so that a user is made aware of the fact that the request is not pending and malicious applications 26 cannot trick the user into authorizing an undesired action.

Applications 26 other than the one making the request for biometric authorization do not have access to the verification information. Accordingly, if a malicious application 26 were to trigger another application to request verification for an action in the background and conceal the action that is being authorized by overwriting all or a portion of the main screen 16, there would be a mismatch between the request for biometric authorization represented on the main screen 16 and the request that is being verified by the biometric authorization device 18. A user would therefore be able to tell that an attack was occurring and not provide biometric information to authorize the action.

Figure 3:
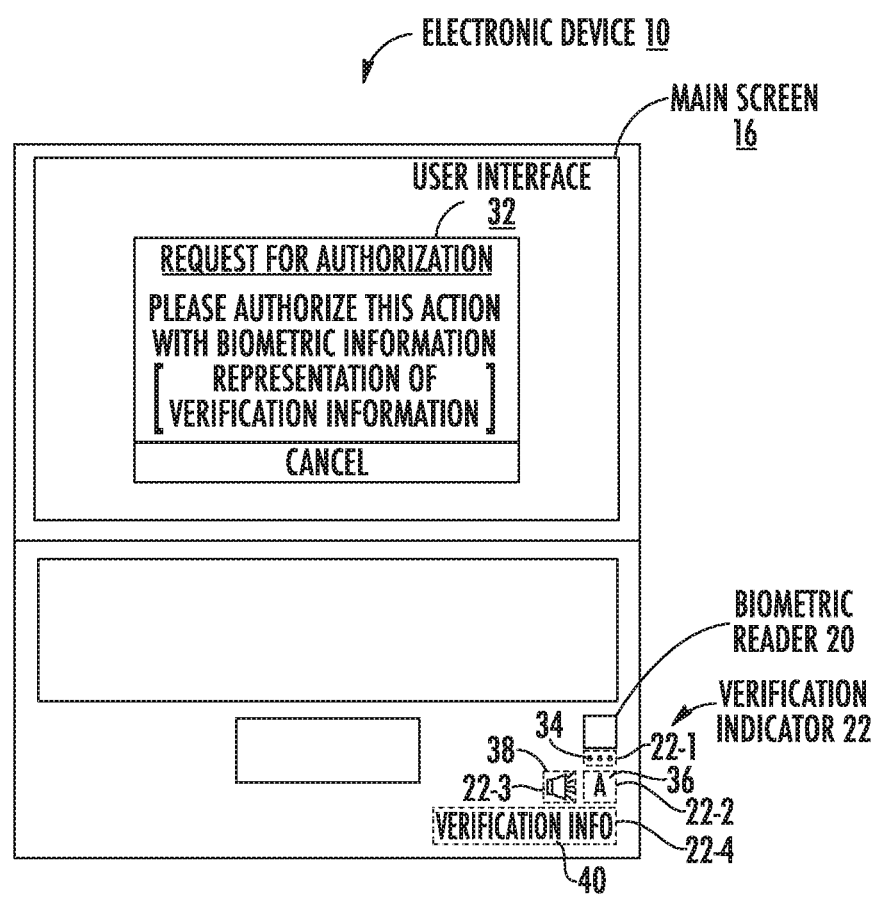
FIG. 3 illustrates providing biometric authorization of an action with increased security according to one example of the present disclosure.

FIG. 3 illustrates the electronic device 10 as a portable computer for purposes of illustration of the principles discussed above. As shown, the electronic device 10 includes the main screen 16, the biometric reader 20, and the verification indicator 22. The additional parts of the electronic device 10 are not shown in FIG. 3, but are still present in the electronic device 10. As shown on the main screen 16, a user interface 32 is presented requesting a user to authorize an action with biometric information. The user interface 32 includes a representation of the verification information such that the main screen 16 displays the verification information. Simultaneously, the verification indicator 22 provides a representation of the verification indicator. FIG. 3 shows several different examples of a verification indicator. For example, a first verification indicator 22-1 is shown including one or more LEDs 34 which may be operated as described above to provide a representation of the verification information. A second verification indicator 22-2 is shown including a single character display 36 which may be operated as described above to provide a representation of the verification information. A third verification indicator 22-3 is shown including a speaker 38 which may be operated as described above to provide a representation of the verification information. A fourth verification indicator 22-4 is shown including a multi-character display 40, which may be a screen of some kind such as a liquid crystal display (LCD). The multi-character display 40 may be operated as described above to provide a representation of the verification information. One or more of the first verification indicator 22-1, the second verification indicator 22-2, the third verification indicator 22-3, the fourth verification indicator 22-4, or any other verification indicators may make up the verification indicator 22 and be operated as discussed herein to provide a representation of the verification information. By observing the main screen 16 and the verification indicator 22, a user is able to easily verify that the request for biometric authorization represented on the main screen 16 is the same request that is being verified by the biometric authorization device 18.

In one example, the verification information is a color identifying the request. The main screen 16 displays a textual representation of the color (e.g., "red", "blue", or "green") or the color itself. The verification indicator 22 displays the color via a multi-color LED. A user can verify that the request being authorized by the biometric authorization device 18 is the same as the one being represented on the main screen 16 by verifying that the colors match. In another example, the verification information is textual information identifying the request. The main screen 16 displays the textual information. The verification indicator 22 displays the textual information via a single character display, a multi-character display, or a screen. A user can verify that the request being authorized by the biometric authorization device 18 is the same as the one being represented on the main screen 16 by verifying that the textual information matches.

Figure 4:
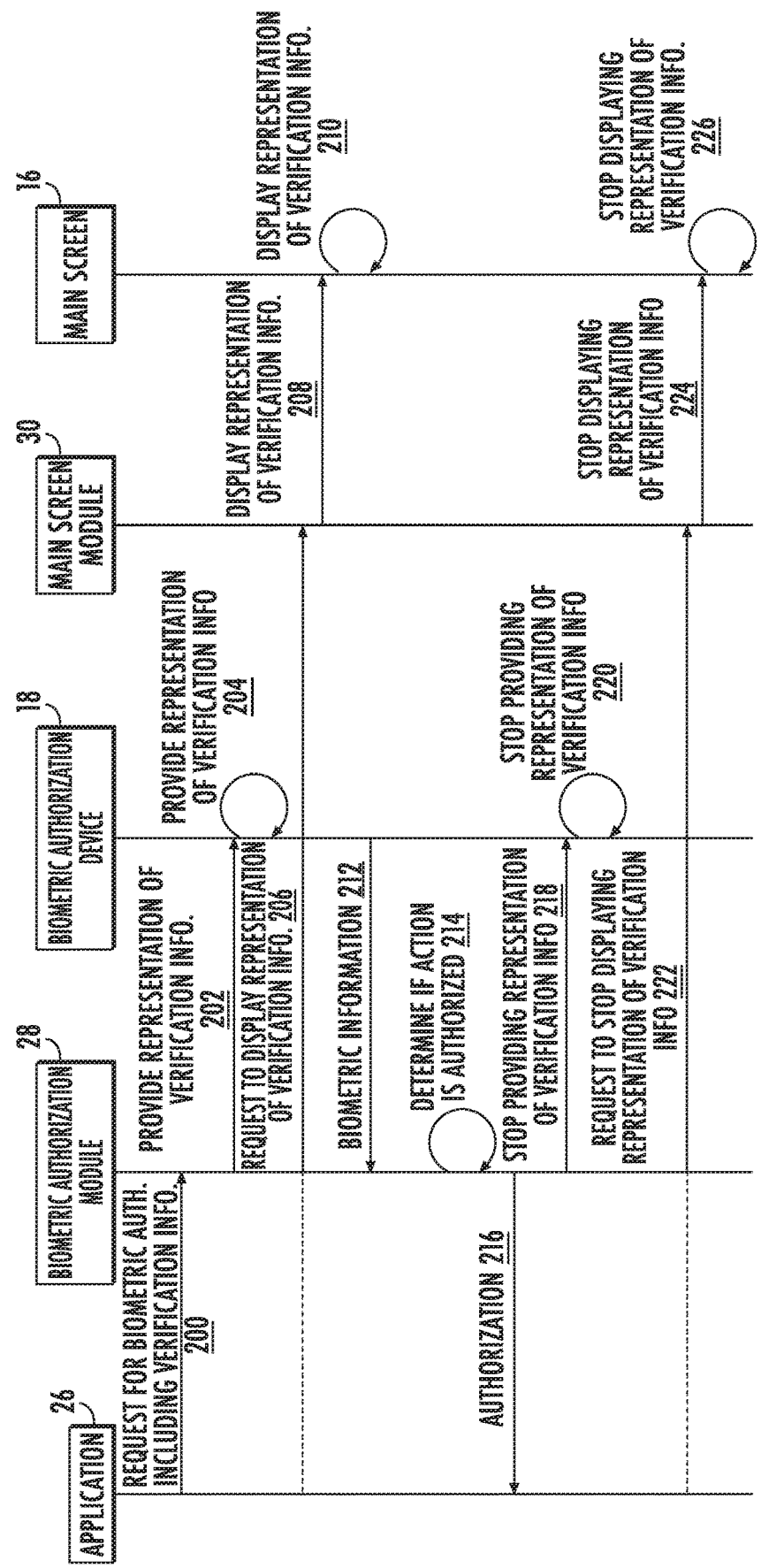
FIG. 4 is a call flow diagram illustrating a method for providing biometric authorization of an action with increased security according to one example of the present disclosure.

FIG. 4 is a call flow diagram illustrating how the various parts of the electronic device 10 interact to provide the biometric authorization functionality discussed above. As discussed above, an application 26 sends a request for biometric authorization to the biometric authorization module 28 (200). The request includes verification information, which as discussed above is information that uniquely identifies the request. The request may be provided via inter-process communication (IPC). The biometric authorization module 28 may provide an application programming interface (API), which is made available to applications 26 on the electronic device 10 to facilitate the requests for biometric authorization.

In response to receiving the request for biometric authorization, the biometric authorization module 28 instructs the biometric authorization device 18 to provide a representation of the verification information (202). The instructions from the biometric authorization module 28 to the biometric authorization device 18 may be provided via a serial interface such as a universal serial bus (USB) or by any other suitable means for communication between the biometric authorization module 28 and the biometric authorization device 18. As discussed above, only the biometric authorization module 28 can interface with the biometric authorization device 18 to prevent the security vulnerabilities discussed above. Accordingly, the biometric authorization module 28 and the biometric authorization device 18 may communicate in a secure manner using pre-shared keys or any other security measures necessary to ensure that the biometric authorization device 18 can only be accessed by the biometric authorization module 28.

In response to instructions from the biometric authorization module 28 to provide a representation of the verification information, the biometric authorization device 18 provides the representation of the verification information (204). As discussed above, this may involve changing the color of a multi-color LED, displaying text from a single character display, a multi-character display, or a screen, providing audible information, or providing haptic information.

The biometric authorization module 28, or in some examples the application 26, also requests the main screen module 30 to display a representation of the verification information (206). Due to the fact that the request to the main screen module 30 may be provided from either the biometric authorization module 28 or the application 26, a dashed line is shown from the application 26 to the main screen module 30 and a solid line is shown from the biometric authorization module 28 to the main screen module 30. The request may include various information required to display a desired user interface including the verification information. As discussed above, the representation of the verification information displayed by the main screen 16 may be the same as or different from the representation of the verification information provided from the verification indicator 22. For example, the representation of the verification information displayed by the main screen 16 may be textual, while the verification information provided from the verification indicator 22 may be visual, audible, haptic, or textual.

In response to the request to display the representation of the verification information from the main screen 16, the main screen module 30 instructs the main screen 16 to display the verification information (208). The instructions from the main screen module 30 to the main screen 16 may be provided via a serial interface such as USB or by any other suitable means for communication between the main screen module 30 and the main screen 16.

In response to instructions from the main screen module 30 to display the representation of the verification information, the main screen 16 displays the representation of the verification information (210).

At some point, the user may provide biometric information via the biometric reader 20 of the biometric authorization device 18. The biometric information is provided from the biometric authorization device 18 to the biometric authorization module 28 (212). As discussed above, the biometric information may include a fingerprint scan, a facial scan, a retinal scan, or any other type of biometric information.

The biometric authorization module 28 determines if the action is authorized based on the biometric information (214). To do so, the biometric authorization module 28 may involve comparing the biometric information to a set of known biometric information for a user or users that are able to authorize the action.

The biometric authorization module 28 notifies the application 26 whether the action is authorized or not (216). Because the request for biometric authorization is no longer pending, the biometric authorization module 28 then instructs the biometric authorization device 18 to stop providing the representation of the verification information from the verification indicator 22 (218). In response, the biometric authorization device 18 stops providing the representation of the verification information from the verification indicator 22 (220). The biometric authorization module 28, or in some examples the application 26, also requests the main screen module 30 to stop displaying the verification information on the main screen 16 (222). The main screen module 30 instructs the main screen 16 to stop displaying the verification information (224), in response to which the main screen 16 stops displaying the verification information (226).

Because the biometric authorization module 28 is a component of the electronic device 10, functionality implemented by the biometric authorization module 28 may be attributed to the electronic device 10 generally. Moreover, in examples where the biometric authorization module 28 comprises software instructions that program the processing circuitry 14 to carry out functionality discussed herein, functionality implemented by the biometric authorization module 28 may be attributed herein to the processing circuitry 14.

Individuals will recognize improvements and modifications to the preferred examples of the disclosure. All such improvements and modifications are considered within the scope of the concepts disclosed herein and the claims that follow.

What is claimed is:

1. An electronic device, comprising:
a biometric authorization device comprising a biometric reader and a verification indicator associated with the biometric reader, the verification indicator comprising a first hardware presentation device;
a main screen comprising a second hardware presentation device that is separate from the verification indicator;
a memory; and
a processor device coupled to the biometric reader, the verification indicator, the main screen, and the memory, the processor device configured to:
receive a request for biometric authorization of an action from an application, the request comprising verification information that allows a user to uniquely identify the request;
display a representation of the verification information from the main screen;
concurrently with the display of the representation of the verification information from the main screen, provide a representation of the verification information from the verification indicator of the biometric authorization device;
block access, while the request is pending, to the verification indicator by another application that is not related to the request;
authorize the action based on biometric information from the biometric reader; and
in response to the request no longer being pending, remove the representation of the verification information from the verification indicator of the biometric authorization device.

2. The electronic device of claim 1, wherein the verification indicator comprises a textual display and the representation of the verification information provided from the verification indicator comprises text provided on the textual display.

3. The electronic device of claim 2, wherein the verification information comprises information about the action to be authorized by the request for biometric authorization.

4. The electronic device of claim 1, wherein the verification information comprises information about the action to be authorized by the request for biometric authorization.

5. The electronic device of claim 1, wherein the representation of the verification information displayed from the main screen is different from the representation of the verification information provided from the verification indicator.

6. The electronic device of claim 1, wherein the representation of the verification information displayed from the main screen is the same as the representation of the verification information provided from the verification indicator.

7. The electronic device of claim 1, wherein the representation of the verification information provided from the verification indicator is one of a visual representation of the verification information, an audible representation of the verification information, and a haptic representation of the verification information.

8. A method for biometric authorization, comprising:
receiving a request for biometric authorization of an action from an application, the request comprising verification information that allows a user to uniquely identify the request;
displaying a representation of the verification information from a main screen, the main screen comprising a first hardware presentation device;
concurrently with displaying the representation of the verification information from the main screen, providing a representation of the verification information from a verification indicator that is associated with a biometric reader in a biometric authorization device, the verification indicator comprising a second hardware presentation device that is separate from the main screen;

blocking access, while the request is pending, to the verification indicator by another application that is not related to the request;

authorizing the action based on biometric information from the biometric reader; and in response to the request no longer being pending, removing the representation of the verification information from the verification indicator of the biometric authorization device.

9. The method of claim 8, wherein the verification indicator comprises a textual display and the representation of the verification information provided from the verification indicator comprises text provided on the textual display.

10. The method of claim 9, wherein the verification information comprises information about the action to be authorized by the request for biometric authorization.

11. The method of claim 8, wherein the verification information comprises information about the action to be authorized by the request for biometric authorization.

12. The method of claim 8, wherein the representation of the verification information displayed from the main screen is different from the representation of the verification information provided from the verification indicator.

13. The method of claim 8, wherein the representation of the verification information displayed from the main screen is the same as the representation of the verification information provided from the verification indicator.

14. The method of claim 8, wherein the representation of the verification information provided from the verification indicator is one of a visual representation of the verification information, an audible representation of the verification information, and a haptic representation of the verification information.

15. A computer program product for biometric authorization, the computer program product stored on a non-transitory computer-readable storage medium and including instructions configured to cause a processor device to:

receive a request for biometric authorization of an action from an application, the request comprising verification information that allows a user to uniquely identify the request;

display a representation of the verification information from a main screen, the main screen comprising a first hardware presentation device;

concurrently with displaying the representation of the verification information from the main screen, provide a representation of the verification information from a verification indicator that is associated with a biometric reader in a biometric authorization device, the verification indicator comprising a second hardware presentation device that is separate from the main screen;

block access, while the request is pending, to the verification indicator by another application that is not related to the request;

authorize the action based on biometric information from the biometric reader; and in response to the request no longer being pending, remove the representation of the verification information from the verification indicator of the biometric authorization device.

16. The computer program product of claim 15, wherein the verification indicator comprises a textual display and the representation of the verification information provided from the verification indicator comprises text provided on the textual display.

17. The computer program product of claim 16, wherein the verification information comprises information about the action to be authorized by the request for biometric authorization.

18. The computer program product of claim 15, wherein the verification information comprises information about the action to be authorized by the request for biometric authorization.

19. The computer program product of claim 15, wherein the representation of the verification information displayed from the main screen is different from the representation of the verification information provided from the verification indicator.

20. The computer program product of claim 15, wherein the representation of the verification information displayed from the main screen is the same as the representation of the verification information provided from the verification indicator.

* * * * *